Sept. 5, 1950      J. W. McCANN      2,521,238
GARDEN IRRIGATION DEVICE
Filed Feb. 11, 1946
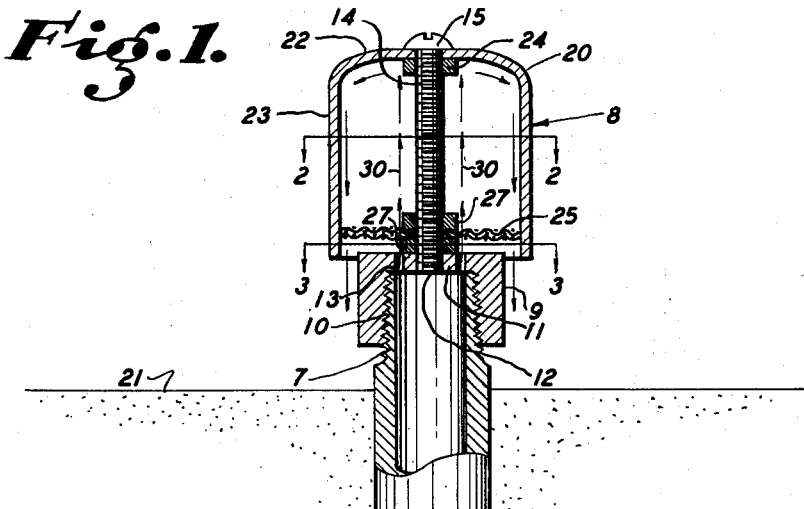
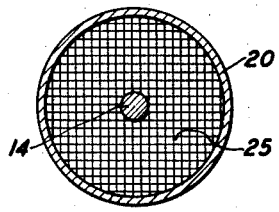
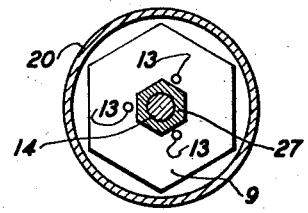
INVENTOR.
JOHN W. McCANN
BY
ATTORNEY Patented Sept. 5, 1950

2,521,238

UNITED STATES PATENT OFFICE 2,521,238

GARDEN IRRIGATION DEVICE

John W. McCann, Pasadena, Calif.

Application February 11, 1946, Serial No. 646,825

4 Claims. (Cl. 299—76)

My invention relates to irrigating means, and relates in particular to an irrigation head especially adapted for use in watering plants, shrubs, trees, and the like, without wetting the portions of the plant which are above the surface of the ground. Many plants, at least during certain periods of growth or prescribed weather conditions, are injured by the application of water to the buds or foliage thereof.

It is an object of the present invention to provide a simple and effective means for watering the ground in which plants are grown, such means delivering all of the irrigation water directly to the surface of the ground in such a manner that it will not be caused to splatter and in such manner that erosion of the soil due to the application of the water is substantially avoided.

Irrigation devices for this general purpose have been used, but they are usually made to be connected to a garden hose so as to be shifted from place to place during the water operation. Being intended primarily for hand use, they are of necessity designed to deliver relatively large volumes of water over short periods of time. An object of my invention is to provide irrigation means having the characteristics herein set forth whereby large areas may be watered over long periods of time, as may be required, substantially without the expenditure of labor since the watering devices of my invention are supplied by a feeder pipe.

A rapid flooding of the surface of the ground does not provide as efficient irrigation, in any except the most sandy soils, as may be obtained when water is applied at a slower rate over a required period of time, so that the soil may have time to become substantially saturated, and also rapid flooding results in water wastage due to water run-off.

It is an object of the present invention to provide an irrigation device wherein a stream of water is delivered from a source of supply, such stream of water being received by means which will dissipate the force of the water and break the stream into smaller streams or drops, or a combination of streams and drops, which pass to the ground substantially by gravity, and therefore substantially without force which would result in soil erosion.

It is an object of the invention to provide an irrigation head adapted to be connected to the upper end of a riser pipe which extends upward from an underground supply pipe, or any other suitable water supply system, this irrigation head having a fitting for connection to the riser pipe, such fitting having at least one upwardly directed water outlet opening, and having means in the path of flow of the stream of water which issues from the water outlet opening or openings for absorbing or dissipating the force from the stream of water and for delivering the water substantially without force to the ground.

A further object of the invention is to provide an irrigation head of the character described herein which is of simple construction, durable and of low cost.

Further objects and advantages of the invention may be brought out in the following part of the specification.

Referring to the drawing which is for illustrative purposes only,

Fig. 1 is a vertically sectioned view showing a preferred form of my invention;

Fig. 2 is a cross section taken as indicated by the line 2—2 of Fig. 1; and

Fig. 3 is a cross section taken as indicated by the line 3—3 of Fig. 1.

In Fig. 1 I show a nipple or riser pipe 5 extending upwardly from a manifold or feeder pipe 6, this riser pipe 5 having threads 7 on its upper end. I have shown a simple form of my irrigation head 8 connected to the upper end of the riser pipe 5.

This irrigation head 8 comprises a fitting 9 for connection to the riser pipe 5. The fitting 9 consists of a cap having an internally threaded opening 10 to receive the threads 7 of the riser pipe and having an upper substantially horizontal wall 11 with a substantially central threaded opening 12 and upwardly directed water outlet openings 13 preferably disposed on opposite sides of the threaded opening 12. The threads of this opening 12 do not extend entirely through the wall 11, or at least full threads are not cut entirely through the opening 12 from the top to the bottom thereof. A cup supporting stem 14 extends upwardly from the fitting 9, this stem 14 consisting of a screw threaded throughout its length and having a head 15 at its upper end. When the screw 14 is threaded into the opening 12, it will bind tightly in the threads of such opening, and therefore locking means for preventing rotation of the screw 14 is not required.

The screw 14 supports a deflector member 20 in elevated relation to the fitting 9, this deflector member being positioned so that the streams of water which pass through the openings 13 under line pressure will strike the deflector member and be thereby directed to the surface of the soil 21. The deflector member 20 comprises a cup having a dished transverse bottom wall 22 and a downwardly extending side wall or skirt 23, the wall 22 being clamped against the head of the screw 14 by a nut 24. Since the wall 22 is slightly dished, the nut 24 tends to flatten the engaged portion of the wall 22 against the lower face of the head 15 of the screw 14, thereby placing the portion of the wall 22 adjacent the screw under strain, thereby producing a binding effect on the nut and avoiding the need for a lock washer. The skirt 23 at the open end of the deflector member cooperates with the upper end of the fitting 9 to provide an annular outlet passage for flow of water from the cup.

A perforate wall element 25 is disposed within the cup 20 so as to extend transversely across the open end of the cup in the path of flow of the streams of water which issue from the openings 13 and the water flowing out of the cup through the annular outlet passage. This perforate wall 25 consists of one or more layers of screen of fine mesh having a hole in the center to receive the screw 14. The screen 25 is clamped on the screw by nuts 27 which engage the upper and lower surfaces of the central portion of the screen 25.

The operation of the irrigation head is as follows. When the water is turned on in the irrigation system, streams or jets of water initially issue from the openings 13 in the general direction indicated by the arrows 30 of Fig. 1. Such streams of water strike the screen 25 and are more or less broken up thereby, and much of the water of the streams passes on through the screen 25 and impinges against the wall 22 of the cup 20. The force of the water which passes through the screen 25 is partially dissipated, and when the water is impinged against the wall 22 of the cup, it is further broken up into a fine spray which is directed laterally toward the side wall 23 of the cup. The side wall 23 of the cup confines the water spray thus formed, the result being that the water runs down inside the cup and passes once more through the screen, by which action any remaining force is dissipated, and the water then falls to the surface of the ground by gravity, irrigating the area for several feet in all directions as it seeps into the soil.

Although simple, the device has many important advantages: accomplishes irrigation without wetting of the plants and reduces the velocity of the water to a point where it will not wash away soil. Since a number of the irrigation heads may be distributed throughout an area, they can be all operated at the same time without trouble or labor, the water being turned on and off by a single valve controlling the flow through the water distribution system. The water flow through the irrigation heads may be adjusted so as to give a rate of delivery most suited to the absorption characteristics of the soil. It will be recognized that the installation of these irrigation heads is very simple, and they may be readily installed on existing sprinkler systems in shrubbery.

I claim as my invention:

1. In an irrigating device of the character described, adapted to be connected to the upper end of a riser pipe, the combination of: a fitting for connection to the upper end of the riser pipe, said fitting having an upper wall containing a threaded opening and at least one upwardly directed water outlet opening; a screw threaded into said threaded opening so as to extend upwardly from said fitting; a screen supported on said screw intermediate the ends thereof, said screen having a portion thereof in the path of flow of water from said outlet opening; and an inverted cup having a transverse wall connected to the upper portion of said screw and a side wall extending downward around said screen in spaced relation to said fitting.

2. In an irrigating device of the character described, the combination of: a fitting adapted to be connected to the upper end of a riser water supply pipe, said fitting having a wall with an upwardly directed constricted outlet opening therein for discharging water from the riser in the form of a jet; a cup supported in an inverted position above said fitting to receive the water in said jet, said cup having a side wall at its open end surrounding said fitting and spaced therefrom to define a passage for flow of water from the cup; and a screen member extending across the open end of the cup over the constricted outlet opening and said passage.

3. In an irrigating device of the character described, the combination of: a fitting adapted to be connected to the upper end of a riser water supply pipe, the fitting having a wall with an upwardly directed constricted outlet opening therein for discharging water from the riser in the form of a jet; a cup supported in an inverted position above said fitting to receive and break up the water in said jet, said cup having a side wall at its open end surrounding said fitting and spaced therefrom to define an annular outlet passage for water leaving the cup; and a transversely positioned perforated member common to said constricted outlet opening and said annular outlet passage for dissipating the force of the jet as it enters the cup and remaining force in the water leaving the cup.

4. In an irrigating device of the character described, the combination of: a fitting adapted to be connected to the upper end of a riser water supply pipe, said fitting having a wall with a plurality of upwardly directed constricted outlet openings therein for discharging water from the riser in the form of jets; a cup supported in an inverted position above said fitting with a bottom wall positioned to receive the impact of water from said jets adjacent its center and deflect the same outwardly to a side wall, said side wall having an open end surrounding said fitting and spaced therefrom to define a downwardly opening annular outlet passage for flow of water from the cup; and a screen member supported across the open end of the cup extending over the constricted outlet openings and said annular outlet passage.

JOHN W. McCANN.

REFERENCES CITED

The following references are of record in the file of this patent:

UNITED STATES PATENTS

| Number | Name | Date |
|---|---|---|
| 391,475 | Lacy, Jr. | Oct. 23, 1888 |
| 603,580 | Shaw | May 3, 1898 |
| 608,646 | Brown | Aug. 9, 1898 |
| 654,132 | Bush | July 24, 1900 |
| 1,208,262 | Wood | Dec. 12, 1916 |
| 1,624,317 | Crownover | Apr. 12, 1927 |
| 1,685,830 | Schidorsky | Oct. 2, 1928 |
| 2,324,234 | Peters | July 13, 1943 |
| 2,420,958 | Landreth | May 20, 1947 |